(12) United States Patent
Tsen

(10) Patent No.: US 9,229,582 B2
(45) Date of Patent: Jan. 5, 2016

(54) MOTION TRAJECTORY CAPTURING DEVICE AND MOTION TRAJECTORY CAPTURING MODULE THEREOF

(71) Applicant: PACING TECHNOLOGY CO., LTD., Taipei (TW)

(72) Inventor: Chi-Wang Tsen, Taipei (TW)

(73) Assignee: PACING TECHNOLOGY CO., LTD., Taipei (TW)

( * ) Notice: Subject to any disclaimer, the term of this patent is extended or adjusted under 35 U.S.C. 154(b) by 0 days.

(21) Appl. No.: 14/448,303

(22) Filed: Jul. 31, 2014

(65) Prior Publication Data
US 2015/0346909 A1 Dec. 3, 2015

(30) Foreign Application Priority Data

May 28, 2014 (TW) .............................. 103118573 A

(51) Int. Cl.
*H01J 40/14* (2006.01)
*G06F 3/042* (2006.01)

(52) U.S. Cl.
CPC .............. *G06F 3/0421* (2013.01); *G06F 3/042* (2013.01)

(58) Field of Classification Search
CPC ............ G06F 3/033; G06F 3/042; G09G 5/08
USPC ............... 250/221, 222.1, 216, 239; 345/163, 345/166, 173, 175; 178/18.09
See application file for complete search history.

(56) References Cited

U.S. PATENT DOCUMENTS

| 8,149,221 B2 * | 4/2012 | Newton | ................ G06F 3/0421 345/173 |
| 2011/0122075 A1 * | 5/2011 | Seo | ......................... G06F 3/042 345/173 |

* cited by examiner

*Primary Examiner* — Kevin Pyo
(74) *Attorney, Agent, or Firm* — Li & Cai Intellectual Property (USA) Office

(57) ABSTRACT

A motion trajectory capturing module includes a light-emitting element, a light-splitting element, a first light-reflecting element, a second light-reflecting element, a lens assembly and a motion trajectory sensing element, characterized in that: a projection light beam generated by the light-emitting element is reflected by the light-splitting element and the first light-reflecting element in sequence to form an illumination light beam passing through a light-transmitting element and projected onto an object moving on the light-transmitting element, the illumination light beam is reflected by the object to form an image light beam reflected by the first light-reflecting element, the image light beam sequentially passes through the light-splitting element and the lens assembly and is projected onto the motion trajectory sensing element through the second light-reflecting element, and the motion trajectory sensing element receives the image light beam to obtain a motion trajectory of the object moving on the light-transmitting element.

10 Claims, 5 Drawing Sheets

MOTION TRAJECTORY CAPTURING DEVICE AND MOTION TRAJECTORY CAPTURING MODULE THEREOF

BACKGROUND OF THE INVENTION

1. Field of the Invention

The instant disclosure relates to a motion trajectory capturing device and a motion trajectory capturing module thereof, and more particularly to a miniaturized motion trajectory capturing device and a miniaturized motion trajectory capturing module thereof.

2. Description of Related Art

An optical finger navigation (OFN) sensor is a derivative product of an optical mouse. The principle of the OFN sensor is that: the infrared light emitted by an infrared LED (Light Emitting Diode) is refracted by a prism and then passes through an infrared filter to a user's finger, then the infrared light can be reflected by the finger to pass through the optical lens to arrive at a sensor to form an image, and a special DSP (Digital Signal Microprocessor) is used to analyze the difference between the images output at different times thereby judging the moving direction and the moving distance and determining the finger position. The OFN may be applied to a keypad and a QWERTY keyboard of a mobile phone. The function of the OFN sensor is similar to a red button of the IBM and Toshiba notebooks, which has a touch function and may be controlled to select by one single finger. The OFN sensor has many features of high positioning precision, a light and thin module, the operating habit of being similar to the prior mouse and so on. The application scope of the OFN sensor has gradually expanded to the relative products, such as a smart phone, a MP4/MP3, a MID (Mobile Internet Device), a remote controller, a laptop computer and so on. However, the OFN sensors in the prior art are large in size and cannot be miniaturized.

SUMMARY OF THE INVENTION

One aspect of the instant disclosure relates to a miniaturized motion trajectory capturing device and a miniaturized motion trajectory capturing module thereof.

One of the embodiments of the instant disclosure provides a motion trajectory capturing device, comprising: a circuit substrate, an external casing, a light-transmitting element and a motion trajectory capturing module. The external casing is disposed on the circuit substrate, wherein the external casing has a top opening formed on the top side thereof. The light-transmitting element is disposed on the external casing to enclose the top opening of the external casing. The motion trajectory capturing module is disposed inside the external casing, wherein the motion trajectory capturing module includes a light-emitting element, a light-splitting element, a first light-reflecting element, a second light-reflecting element, a lens assembly and a motion trajectory sensing element. The light-emitting element is electrically connected to the circuit substrate. The light-splitting element is disposed in front of the light-emitting element. The first light-reflecting element is disposed beside one side of the light-splitting element and separated from the light-splitting element by a first predetermined distance, wherein the first light-reflecting element has a light-reflecting curved surface. The second light-reflecting element is disposed beside another side of the light-splitting element and separated from the light-splitting element by a second predetermined distance. The lens assembly is disposed between the light-splitting element and the second light-reflecting element. The motion trajectory sensing element is disposed under the second light-reflecting element and electrically connected to the circuit substrate. Whereby, a projection light beam generated by the light-emitting element is reflected by the light-splitting element and the light-reflecting curved surface of the first light-reflecting element in sequence to form an illumination light beam that first passes through the light-transmitting element and then is projected onto an object moving on the light-transmitting element, the illumination light beam is reflected by the object to form an image light beam that is projected onto the light-reflecting curved surface and then is reflected by the light-reflecting curved surface, the image light beam first sequentially passes through the light-splitting element and the lens assembly and then is projected onto the motion trajectory sensing element through the second light-reflecting element, and the motion trajectory sensing element receives the image light beam to obtain a motion trajectory of the object moving on the light-transmitting element.

More precisely, the light-splitting element has a light-splitting portion and a first positioning portion connected to the light-splitting portion and positioned inside the external casing, the light-reflecting element has a base portion, an electroplated light-reflecting layer formed on the base portion, and a second positioning portion connected to the base portion and positioned inside the external casing, and the light-reflecting curved surface of the first light-reflecting element is formed on the electroplated light-reflecting layer, wherein the lens assembly includes an optical lens composed of at least two lens units and an aperture stop adjacent to the optical lens, each lens unit has a lens portion and a third positioning portion connected to the lens portion and positioned inside the external casing, and the aperture stop has a screen portion and a through hole passing through the screen portion.

Another one of the embodiments of the instant disclosure provides a motion trajectory capturing module, comprising: a light-emitting element, a light-splitting element, a first light-reflecting element, a second light-reflecting element, a lens assembly and a motion trajectory sensing element. The light-splitting element is disposed in front of the light-emitting element. The first light-reflecting element is disposed beside one side of the light-splitting element and separated from the light-splitting element by a first predetermined distance, wherein the first light-reflecting element has a light-reflecting curved surface. The second light-reflecting element is disposed beside another side of the light-splitting element and separated from the light-splitting element by a second predetermined distance. The lens assembly is disposed between the light-splitting element and the second light-reflecting element. The motion trajectory sensing element is disposed under the second light-reflecting element. Whereby, a projection light beam generated by the light-emitting element is reflected by the light-splitting element and the light-reflecting curved surface of the first light-reflecting element in sequence to form an illumination light beam that first passes through a light-transmitting element and then is projected onto an object moving on the light-transmitting element, the illumination light beam is reflected by the object to form an image light beam that is projected onto the light-reflecting curved surface and then is reflected by the light-reflecting curved surface, the image light beam first sequentially passes through the light-splitting element and the lens assembly and then is projected onto the motion trajectory sensing element through the second light-reflecting element, and the motion trajectory sensing element receives the image light beam to obtain a motion trajectory of the object moving on the light-transmitting element.

Yet another one of the embodiments of the instant disclosure provides a motion trajectory capturing module comprising a light-emitting element, a light-splitting element, a first light-reflecting element, a second light-reflecting element, a lens assembly and a motion trajectory sensing element, characterized in that: a projection light beam generated by the light-emitting element is reflected by the light-splitting element and a light-reflecting curved surface of the first light-reflecting element in sequence to form an illumination light beam that first passes through a light-transmitting element and then is projected onto an object moving on the light-transmitting element, the illumination light beam is reflected by the object to form an image light beam that is projected onto the light-reflecting curved surface and then is reflected by the light-reflecting curved surface, the image light beam first sequentially passes through the light-splitting element and the lens assembly and then is projected onto the motion trajectory sensing element through the second light-reflecting element, and the motion trajectory sensing element receives the image light beam to obtain a motion trajectory of the object moving on the light-transmitting element.

More precisely, the projection light beam generated by the light-emitting element is reflected by the light-splitting element to form a first reflected light beam that is projected on the first light-reflecting element, the first reflected light beam is reflected by the light-reflecting curved surface of the first light-reflecting element to form a second reflected light beam that first passes through the light-transmitting element and then is projected onto the object, wherein both the projection light beam and the first reflected light beam are substantially horizontal moving light beams, and the second reflected light beam is a substantially vertical moving light beam.

More precisely, the second reflected light beam is reflected by the object to form a first motion image light beam that first passes through the light-transmitting element and then is projected on the light-reflecting curved surface and is reflected by the light-reflecting curved surface, the first motion image light beam sequentially passes through the light-splitting element and the lens assembly to form a second motion image light beam that is projected onto the second light-reflecting element, the second motion image light beam is reflected by the second light-reflecting element to form a third motion image light beam that is projected onto the motion trajectory sensing element, and the motion trajectory sensing element receives the third motion image light beam to obtain the motion trajectory of the object moving on the light-transmitting element, wherein both the first motion image light beam and the third motion image light beam are substantially vertical moving light beams, and the second motion image light beam is a substantially horizontal moving light beam.

Therefore, the motion trajectory capturing device and the motion trajectory capturing module can be miniaturized due to the arrangement of the light-emitting element, the light-splitting element, the first light-reflecting element, the second light-reflecting element, the lens assembly and the motion trajectory sensing element, thus the motion trajectory capturing device and the miniaturized motion trajectory capturing module can be applied to any miniaturization electronic product.

To further understand the techniques, means and effects of the instant disclosure applied for achieving the prescribed objectives, the following detailed descriptions and appended drawings are hereby referred to, such that, and through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

The embodiments of "a motion trajectory capturing device and a motion trajectory capturing module thereof" of the instant disclosure are described. Other advantages and objectives of the instant disclosure can be easily understood by one skilled in the art from the disclosure. The instant disclosure can be applied in different embodiments. Various modifications and variations can be made to various details in the description for different applications without departing from the scope of the instant disclosure. The drawings of the instant disclosure are provided only for simple illustrations, but are not drawn to scale and do not reflect the actual relative dimensions. The following embodiments are provided to describe in detail the concept of the instant disclosure, and are not intended to limit the scope thereof in any way.

First Embodiment

Figure 1:
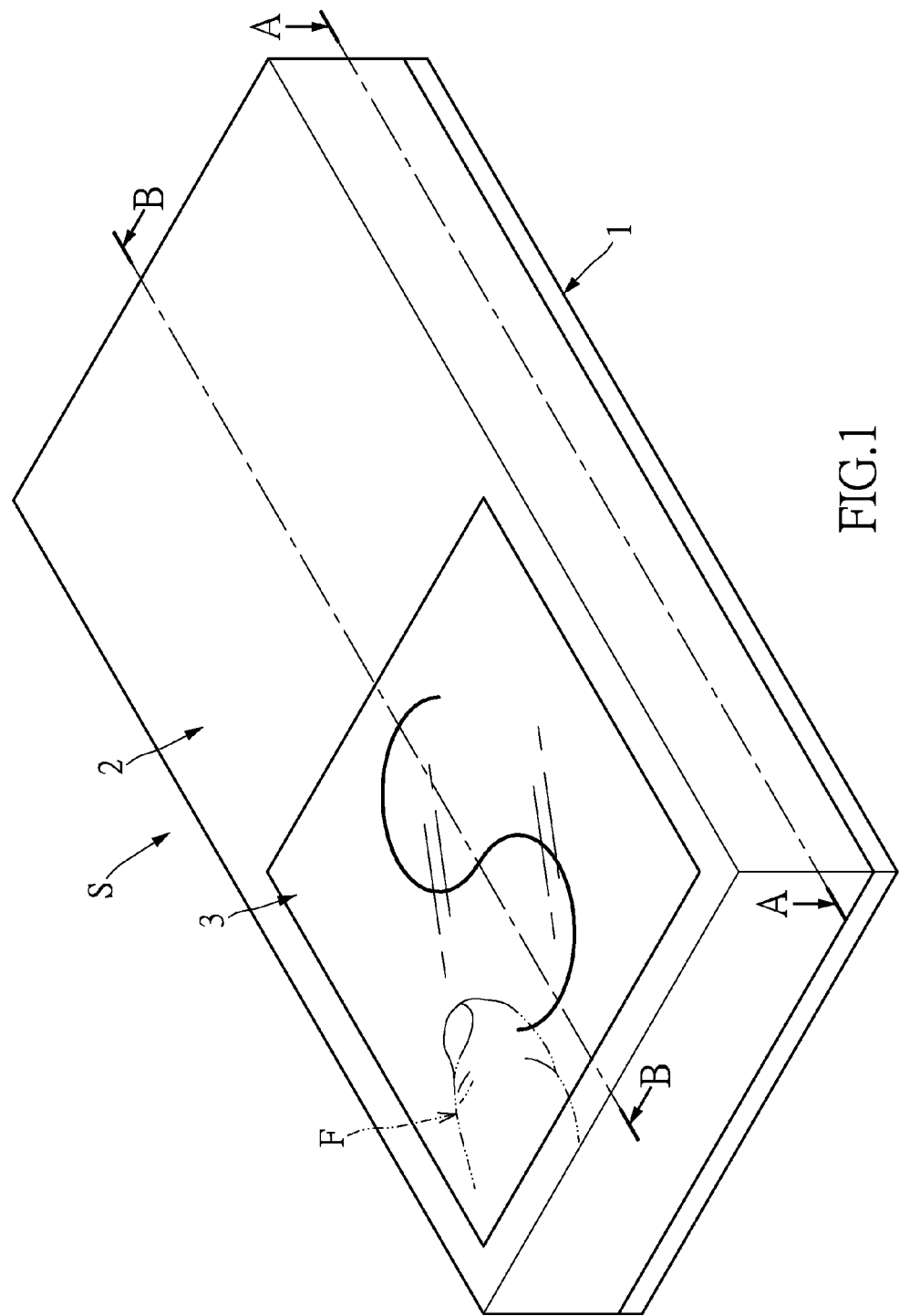
FIG. 1 shows one perspective, schematic view of the motion trajectory capturing device according to the first embodiment of the instant disclosure.
Figure 2:
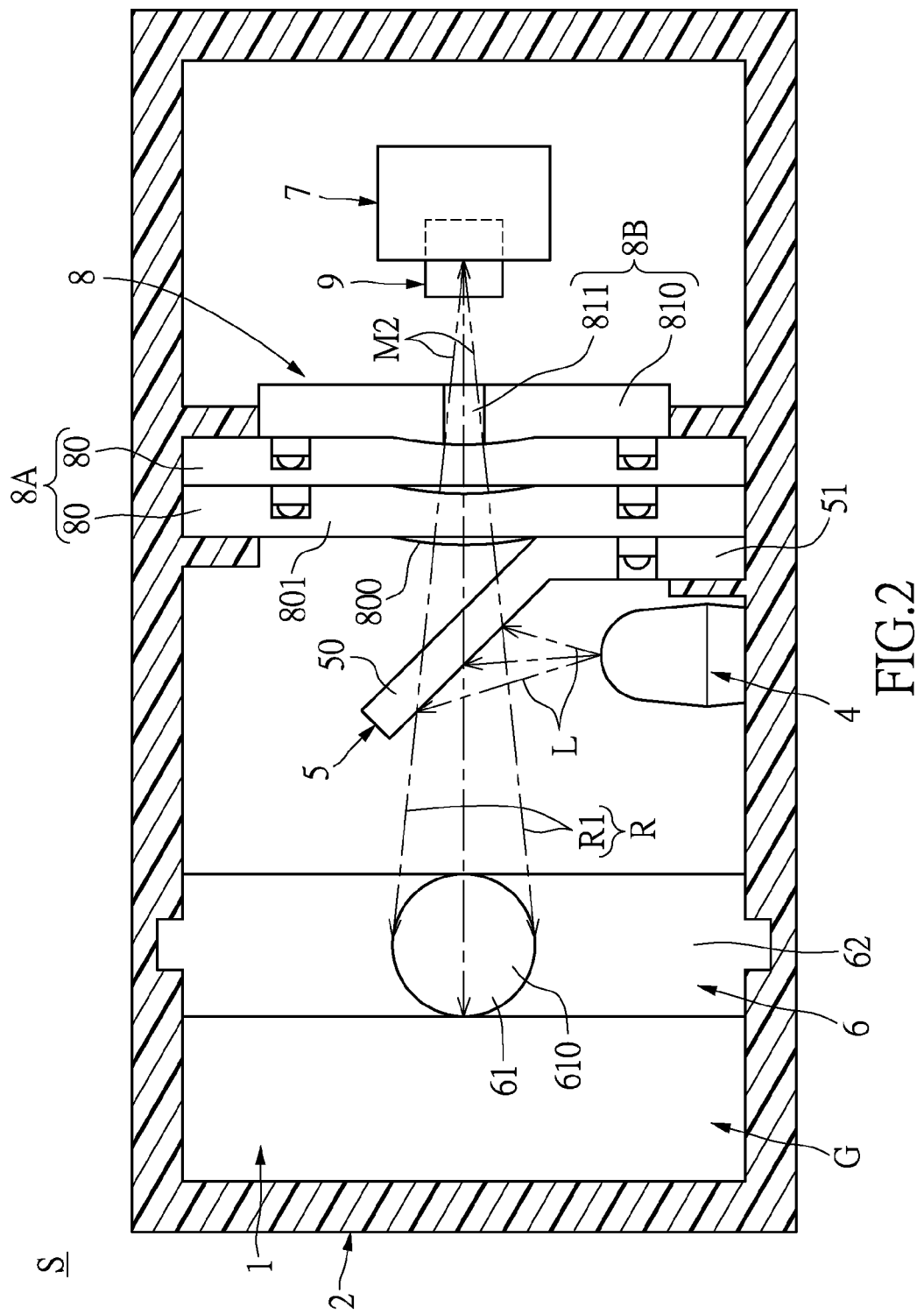
FIG. 2 shows a cross-sectional view taken along the section line A-A of FIG. 1.
Figure 3:
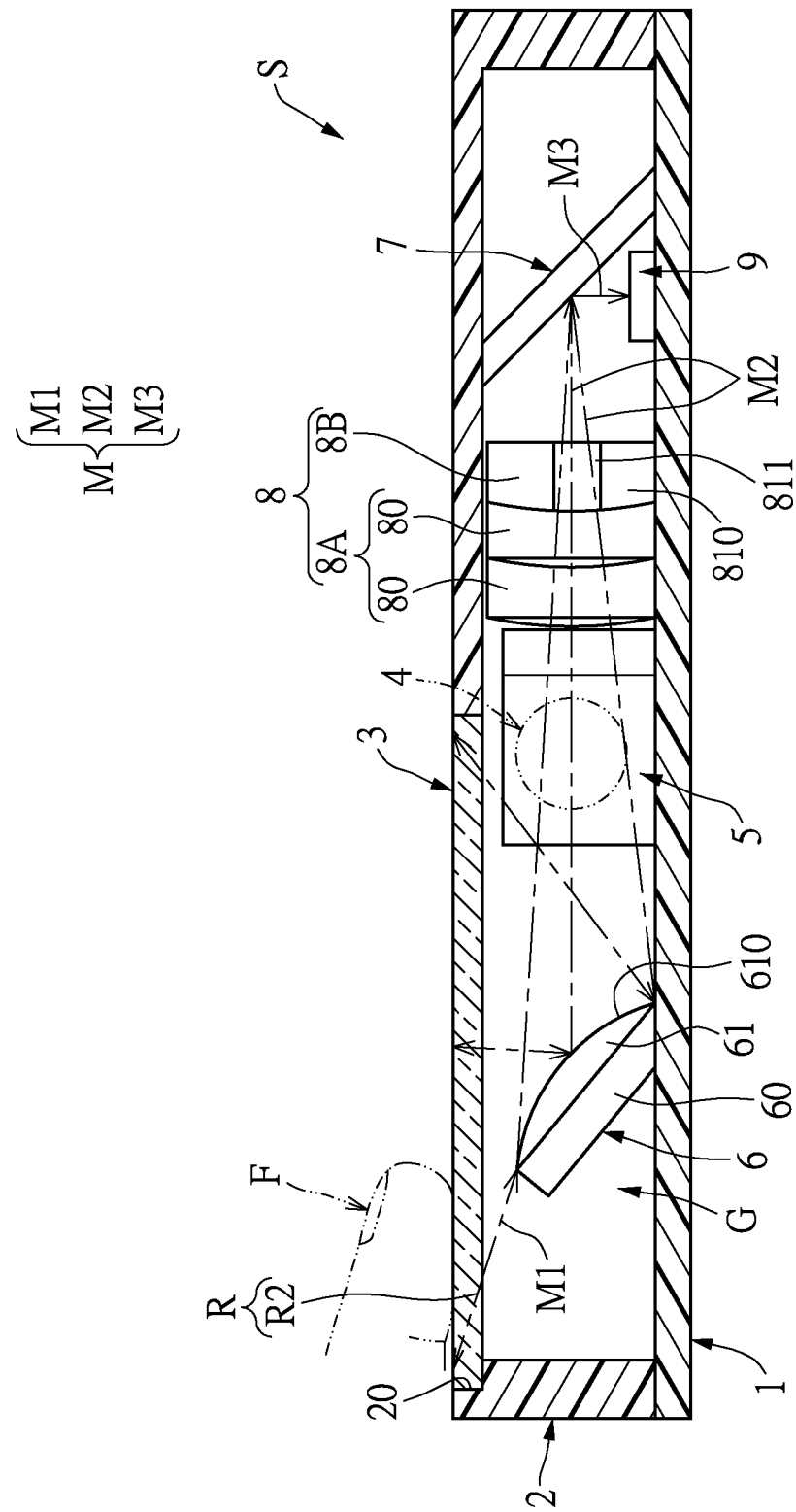
FIG. 3 shows a cross-sectional view taken along the section line B-B of FIG. 1.

Referring to FIG. 1 to FIG. 3, FIG. 2 shows a cross-sectional view taken along the section line A-A of FIG. 1, and FIG. 3 shows a cross-sectional view taken along the section line B-B of FIG. 1. The first embodiment of the instant disclosure provides a motion trajectory capturing device S, comprising: a circuit substrate 1, an external casing 2, a light-transmitting element 3 and a motion trajectory capturing module G, and the motion trajectory capturing module G is disposed inside the external casing 2. The motion trajectory capturing module G includes a light-emitting element 4, a light-splitting element 5, a first light-reflecting element 6, a second light-reflecting element 7, a lens assembly 8 and a motion trajectory sensing element 9.

Firstly, referring to FIG. 1 and FIG. 3, the external casing 2 is disposed on the circuit substrate 1, and the external casing 2 has a top opening 20 formed on the top side thereof. Because the size of the light-transmitting element 3 is substantially the same as the top opening 20, the light-transmitting element 3 can be disposed on the external casing 2 to enclose the top opening 20 of the external casing 2. For example, the circuit substrate 1 may be a board having a predetermined circuit layout formed thereon in advance. The external casing 2 may be made of opaque material. The light-transmitting element 3 may be a transparent board made of glass or plastic material, and any type of object 3 (such as user's finger) can be freely moved on the light-transmitting element 3.

Moreover, referring to FIG. 2 and FIG. 3, the light-emitting element 4 is electrically connected to the circuit substrate 1. The light-splitting element 5 is disposed in front of the light-emitting element 4. The first light-reflecting element 6 is disposed beside (next to) one side of the light-splitting element 5 and separated from the light-splitting element 5 by a first predetermined distance, and the first light-reflecting element 6 has a light-reflecting curved surface 60. More precisely, the light-emitting element 4 (such as LED) is transversely placed on the circuit substrate 1, thus the projection light beam L generated by the light-emitting element 4 is moved along a substantially transverse direction or substantially horizontal to the top surface of the circuit substrate 1. The light-splitting element 5 (or called a light-separating plate) has a light-splitting portion 50 and a first positioning portion 51 connected to the light-splitting portion 50 and positioned inside the external casing 2, and the light-splitting portion 50 of the light-splitting element 5 is substantially vertically disposed on the circuit substrate 1 and in front of the light-emitting element 4. The light-reflecting element 6 has a base portion 60, an electroplated light-reflecting layer 61 formed on the base portion 60 by electroplating, and a second positioning portion 62 connected to the base portion 60 and positioned inside the external casing 2, and the light-reflecting curved surface 610 of the first light-reflecting element 6 is just then on the electroplated light-reflecting layer 61. Of course, the light-reflecting curved surface 610 can be formed by other ways than electroplating.

Furthermore, referring to FIG. 2 and FIG. 3, the second light-reflecting element 7 is disposed beside (next to) another side of the light-splitting element 5 and separated from the light-splitting element 5 by a second predetermined distance. The lens assembly 8 is disposed between the light-splitting element 5 and the second light-reflecting element 7. The motion trajectory sensing element 9 is disposed under the second light-reflecting element 7 and electrically connected to the circuit substrate 1. More precisely, the lens assembly 8 includes an optical lens 8A composed of at least one lens unit 80 (for example, there are two lens units 80 shown in FIG. 80) and an aperture stop 8B (or a pupil) adjacent to the optical lens 8A, each lens unit 80 has a lens portion 800 and a third positioning portion 801 connected to the lens portion 800 and positioned inside the external casing 2, and the aperture stop 8B has a screen portion 810 and a through hole 811 passing through the screen portion 810. The motion trajectory sensing element 9 may be an optical finger navigation (OFN) sensor.

Hence, referring to FIG. 2 and FIG. 3, a projection light beam L generated by the light-emitting element 4 is reflected by the light-splitting element 5 and the light-reflecting curved surface 610 of the first light-reflecting element 6 in sequence to form an illumination light beam R that first passes through the light-transmitting element 3 and then is upwardly projected onto an object F moving on the light-transmitting element 3. The illumination light beam R is formed as a wide-angle illumination that can be widely projected onto the object F due to design of the light-reflecting curved surface 610 of the first light-reflecting element 6, thus most of area of the object F moving on the light-transmitting element 3 can be illuminated by the illumination light beam R. The illumination light beam R is reflected by the object F to form an image light beam M that is downwardly projected onto the light-reflecting curved surface 610 and then is reflected by the light-reflecting curved surface 610. The image light beam M first sequentially passes through the light-splitting element 5 and the lens assembly 8 and then is downwardly projected onto the motion trajectory sensing element 9 through the second light-reflecting element 7 (i.e., the image light beam M is downwardly projected onto the motion trajectory sensing element 9 after the image light beam M is reflected by the second light-reflecting element 7). Whereby, the motion trajectory sensing element 9 can receive the image light beam M to obtain a motion trajectory (such as S-shaped motion trajectory as shown in FIG. 1) of the object F moving on the light-transmitting element 3.

More precisely, referring to FIG. 2 and FIG. 3, the projection light beam L generated by the light-emitting element 4 is reflected by the light-splitting element 5 to form a first reflected light beam R1 that is forwardly projected on the first light-reflecting element 6 (as shown in FIG. 2). The first reflected light beam R1 is reflected by the light-reflecting curved surface 610 of the first light-reflecting element 6 to form a second reflected light beam R2 that first passes through the light-transmitting element 3 and then is upwardly projected onto the object F (as shown in FIG. 3). It is worth noting that, both the projection light beam L and the first reflected light beam R1 are substantially horizontal moving light beams that can be moved along a substantially horizontal direction, and the second reflected light beam R2 is a substantially vertical moving light beam that can be moved along a substantially vertical direction.

More precisely, referring to FIG. 2 and FIG. 3, the second reflected light beam R2 is reflected by the object F (i.e., the second reflected light beam R2 goes back through the object F) to form a first motion image light beam M1 that first passes through the light-transmitting element 3 and then is downwardly projected on the light-reflecting curved surface 610 and is reflected by the light-reflecting curved surface 610 (as shown in FIG. 3). The first motion image light beam M1 sequentially passes through the light-splitting element 5 and the lens assembly 8 to form a second motion image light beam M2 that is projected onto the second light-reflecting element 7 (as shown in FIG. 2 or FIG. 3). The second motion image light beam M2 is reflected by the second light-reflecting element 7 to form a third motion image light beam M3 that is downwardly projected onto the motion trajectory sensing element 9 (as shown in FIG. 3). Whereby, the motion trajectory sensing element 9 can receive the third motion image light beam M3 to obtain the motion trajectory of the object F moving on the light-transmitting element 3. It is worth noting that, both the first motion image light beam M1 and the third motion image light beam M3 are substantially vertical moving light beams that can be moved along a substantially vertical direction, and the second motion image light beam M2 is a substantially horizontal moving light beam that can be moved along a substantially horizontal direction.

It is worth mentioning that the motion trajectory capturing device S can be miniaturized due to the arrangement of the light-emitting element 4, the light-splitting element 5, the first light-reflecting element 6, the second light-reflecting element 7, the lens assembly 8 and the motion trajectory sensing element 9, thus the miniaturized motion trajectory capturing device S can be applied to any miniaturization electronic product such as a smart phone, a MP4/MP3, a MID (Mobile Internet Device), a remote controller, a laptop computer and so on.

Second Embodiment

Figure 4:
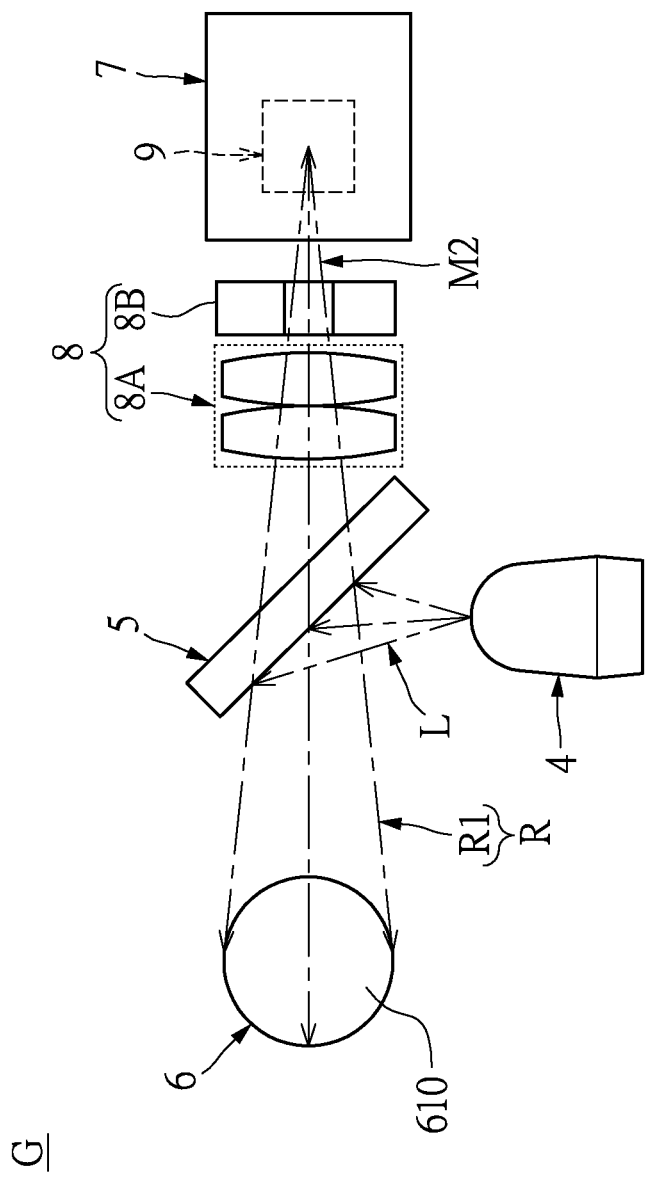
FIG. 4 shows a top, cross-sectional, schematic view of the motion trajectory capturing device according to the second embodiment of the instant disclosure.
Figure 5:
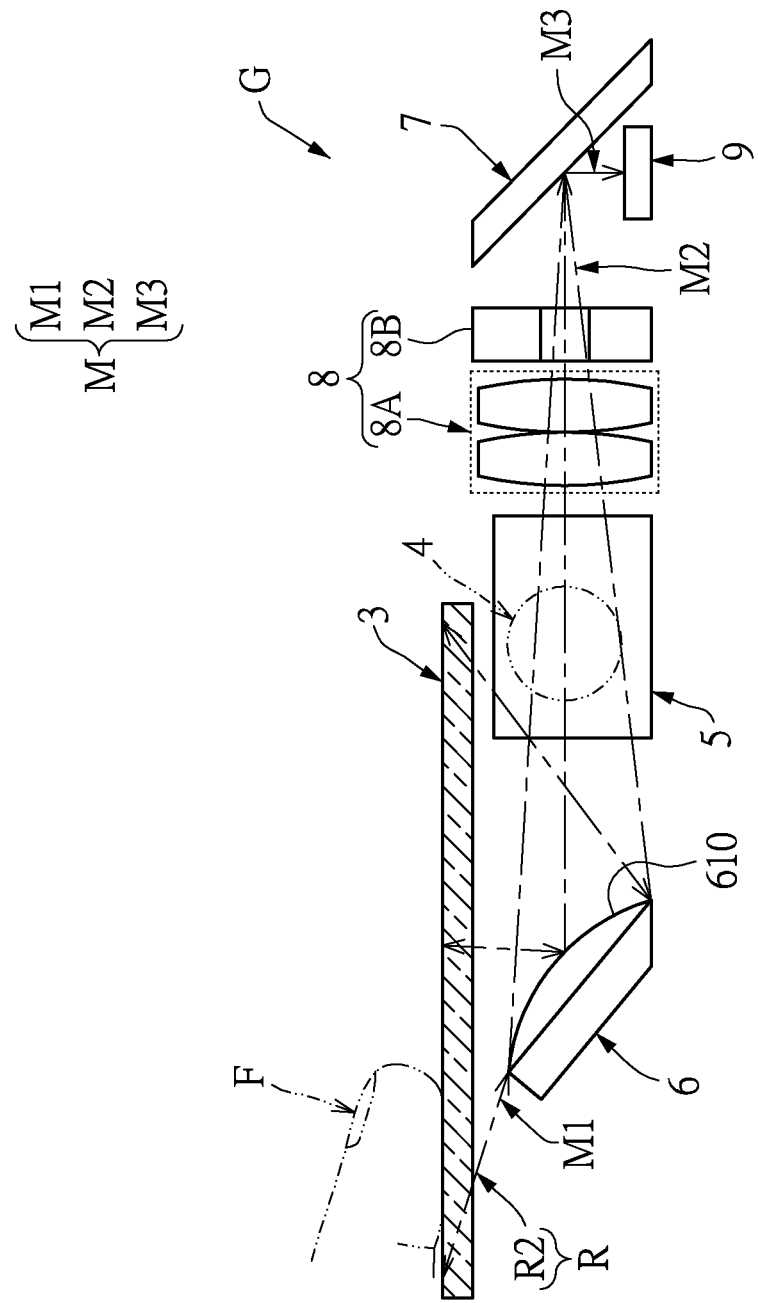
FIG. 5 shows a lateral, cross-sectional, schematic view of the motion trajectory capturing device according to the second embodiment of the instant disclosure.

Referring to FIG. 4 and FIG. 5, the second embodiment of the instant disclosure provides a motion trajectory capturing module G, comprising: a light-emitting element 4, a light-splitting element 5, a first light-reflecting element 6, a second light-reflecting element 7, a lens assembly 8 and a motion trajectory sensing element 9. The light-splitting element 5 is disposed in front of the light-emitting element 4. The first light-reflecting element 6 is disposed beside one side of the light-splitting element 5 and separated from the light-splitting element 5 by a first predetermined distance, and the first light-reflecting element 6 has a light-reflecting curved surface 610. The second light-reflecting element 7 is disposed beside another side of the light-splitting element 5 and separated from the light-splitting element 5 by a second predetermined distance. The lens assembly 8 is disposed between the light-splitting element 5 and the second light-reflecting element 7. The motion trajectory sensing element 9 is disposed under the second light-reflecting element 7.

Hence, referring to FIG. 4 and FIG. 5, a projection light beam L generated by the light-emitting element 4 is reflected by the light-splitting element 5 and the light-reflecting curved surface 610 of the first light-reflecting element 6 in sequence to form an illumination light beam R that first passes through the light-transmitting element 3 and then is upwardly projected onto an object F moving on the light-transmitting element 3. The illumination light beam R is formed as a wide-angle illumination that can be widely projected onto the object F due to design of the light-reflecting curved surface 610 of the first light-reflecting element 6, thus most of area of the object F moving on the light-transmitting element 3 can be illuminated by the illumination light beam R. The illumination light beam R is reflected by the object F to form an image light beam M that is downwardly projected onto the light-reflecting curved surface 610 and then is reflected by the light-reflecting curved surface 610. The image light beam M first sequentially passes through the light-splitting element 5 and the lens assembly 8 and then is downwardly projected onto the motion trajectory sensing element 9 through the second light-reflecting element 7 (i.e., the image light beam M is downwardly projected onto the motion trajectory sensing element 9 after the image light beam M is reflected by the second light-reflecting element 7). Whereby, the motion trajectory sensing element 9 can receive the image light beam M to obtain a motion trajectory of the object F moving on the light-transmitting element 3.

More precisely, referring to FIG. 4 and FIG. 5, the projection light beam L generated by the light-emitting element 4 is reflected by the light-splitting element 5 to form a first reflected light beam R1 that is forwardly projected on the first light-reflecting element 6 (as shown in FIG. 4). The first reflected light beam R1 is reflected by the light-reflecting curved surface 610 of the first light-reflecting element 6 to form a second reflected light beam R2 that first passes through the light-transmitting element 3 and then is upwardly projected onto the object F (as shown in FIG. 5). The second reflected light beam R2 is reflected by the object F (i.e., the second reflected light beam R2 goes back through the object F) to form a first motion image light beam M1 that first passes through the light-transmitting element 3 and then is downwardly projected on the light-reflecting curved surface 610 and is reflected by the light-reflecting curved surface 610 (as shown in FIG. 5). The first motion image light beam M1 sequentially passes through the light-splitting element 5 and the lens assembly 8 to form a second motion image light beam M2 that is projected onto the second light-reflecting element 7 (as shown in FIG. 4 or FIG. 5). The second motion image light beam M2 is reflected by the second light-reflecting element 7 to form a third motion image light beam M3 that is downwardly projected onto the motion trajectory sensing element 9 (as shown in FIG. 5). Whereby, the motion trajectory sensing element 9 can receive the third motion image light beam M3 to obtain the motion trajectory of the object F moving on the light-transmitting element 3.

It is worth mentioning that the motion trajectory capturing module G can be miniaturized due to the arrangement of the light-emitting element 4, the light-splitting element 5, the first light-reflecting element 6, the second light-reflecting element 7, the lens assembly 8 and the motion trajectory sensing element 9, thus the miniaturized motion trajectory capturing module G can be applied to any miniaturization electronic product such as a smart phone, a MP4/MP3, a MID (Mobile Internet Device), a remote controller, a laptop computer and so on.

In conclusion, the motion trajectory capturing device S and the motion trajectory capturing module G can be miniaturized due to the arrangement of the light-emitting element 4, the light-splitting element 5, the first light-reflecting element 6, the second light-reflecting element 7, the lens assembly 8 and the motion trajectory sensing element 9, thus the motion trajectory capturing device S and the miniaturized motion trajectory capturing module G can be applied to any miniaturization electronic product.

The aforementioned descriptions merely represent the preferred embodiments of the instant disclosure, without any intention to limit the scope of the instant disclosure which is fully described only within the following claims. Various equivalent changes, alterations or modifications based on the claims of the instant disclosure are all, consequently, viewed as being embraced by the scope of the instant disclosure.

What is claimed is:

1. A motion trajectory capturing device, comprising:
   a circuit substrate;
   an external casing disposed on the circuit substrate, wherein the external casing has a top opening formed on the top side thereof;
   a light-transmitting element disposed on the external casing to enclose the top opening of the external casing; and
   a motion trajectory capturing module disposed inside the external casing, wherein the motion trajectory capturing module includes:
      a light-emitting element electrically connected to the circuit substrate;
      a light-splitting element disposed in front of the light-emitting element;
      a first light-reflecting element disposed beside one side of the light-splitting element and separated from the light-splitting element by a first predetermined distance, wherein the first light-reflecting element has a light-reflecting curved surface;
      a second light-reflecting element disposed beside another side of the light-splitting element and separated from the light-splitting element by a second predetermined distance;
      a lens assembly disposed between the light-splitting element and the second light-reflecting element; and
      a motion trajectory sensing element disposed under the second light-reflecting element and electrically connected to the circuit substrate;
   wherein a projection light beam generated by the light-emitting element is reflected by the light-splitting element and the light-reflecting curved surface of the first light-reflecting element in sequence to form an illumination light beam that first passes through the light-transmitting element and then is projected onto an object moving on the light-transmitting element, the illumination light beam is reflected by the object to form an image light beam that is projected onto the light-reflecting curved surface and then is reflected by the light-reflecting curved surface, the image light beam first sequentially passes through the light-splitting element and the lens assembly and then is projected onto the motion trajectory sensing element through the second light-reflecting element, and the motion trajectory sensing element receives the image light beam to obtain a motion trajectory of the object moving on the light-transmitting element.

2. The motion trajectory capturing device of claim 1, wherein the light-splitting element has a light-splitting portion and a first positioning portion connected to the light-splitting portion and positioned inside the external casing, the light-reflecting element has a base portion, an electroplated light-reflecting layer formed on the base portion, and a second positioning portion connected to the base portion and positioned inside the external casing, and the light-reflecting curved surface of the first light-reflecting element is formed on the electroplated light-reflecting layer, wherein the lens assembly includes an optical lens composed of at least two lens units and an aperture stop adjacent to the optical lens, each lens unit has a lens portion and a third positioning portion connected to the lens portion and positioned inside the external casing, and the aperture stop has a screen portion and a through hole passing through the screen portion.

3. The motion trajectory capturing device of claim 1, wherein the projection light beam generated by the light-emitting element is reflected by the light-splitting element to form a first reflected light beam that is projected on the first light-reflecting element, the first reflected light beam is reflected by the light-reflecting curved surface of the first light-reflecting element to form a second reflected light beam that first passes through the light-transmitting element and then is projected onto the object, wherein both the projection light beam and the first reflected light beam are substantially horizontal moving light beams, and the second reflected light beam is a substantially vertical moving light beam.

4. The motion trajectory capturing device of claim 3, wherein the second reflected light beam is reflected by the object to form a first motion image light beam that first passes through the light-transmitting element and then is projected on the light-reflecting curved surface and is reflected by the light-reflecting curved surface, the first motion image light beam sequentially passes through the light-splitting element and the lens assembly to form a second motion image light beam that is projected onto the second light-reflecting element, the second motion image light beam is reflected by the second light-reflecting element to form a third motion image light beam that is projected onto the motion trajectory sensing element, and the motion trajectory sensing element receives the third motion image light beam to obtain the motion trajectory of the object moving on the light-transmitting element, wherein both the first motion image light beam and the third motion image light beam are substantially vertical moving light beams, and the second motion image light beam is a substantially horizontal moving light beam.

5. A motion trajectory capturing module, comprising:
a light-emitting element;
a light-splitting element disposed in front of the light-emitting element;
a first light-reflecting element disposed beside one side of the light-splitting element and separated from the light-splitting element by a first predetermined distance, wherein the first light-reflecting element has a light-reflecting curved surface;
a second light-reflecting element disposed beside another side of the light-splitting element and separated from the light-splitting element by a second predetermined distance;

a lens assembly disposed between the light-splitting element and the second light-reflecting element; and
a motion trajectory sensing element disposed under the second light-reflecting element;
wherein a projection light beam generated by the light-emitting element is reflected by the light-splitting element and the light-reflecting curved surface of the first light-reflecting element in sequence to form an illumination light beam that first passes through a light-transmitting element and then is projected onto an object moving on the light-transmitting element, the illumination light beam is reflected by the object to form an image light beam that is projected onto the light-reflecting curved surface and then is reflected by the light-reflecting curved surface, the image light beam first sequentially passes through the light-splitting element and the lens assembly and then is projected onto the motion trajectory sensing element through the second light-reflecting element, and the motion trajectory sensing element receives the image light beam to obtain a motion trajectory of the object moving on the light-transmitting element.

6. The motion trajectory capturing module of claim 5, wherein the projection light beam generated by the light-emitting element is reflected by the light-splitting element to form a first reflected light beam that is projected on the first light-reflecting element, the first reflected light beam is reflected by the light-reflecting curved surface of the first light-reflecting element to form a second reflected light beam that first passes through the light-transmitting element and then is projected onto the object, wherein both the projection light beam and the first reflected light beam are substantially horizontal moving light beams, and the second reflected light beam is a substantially vertical moving light beam.

7. The motion trajectory capturing module of claim 6, wherein the second reflected light beam is reflected by the object to form a first motion image light beam that first passes through the light-transmitting element and then is projected on the light-reflecting curved surface and is reflected by the light-reflecting curved surface, the first motion image light beam sequentially passes through the light-splitting element and the lens assembly to form a second motion image light beam that is projected onto the second light-reflecting element, the second motion image light beam is reflected by the second light-reflecting element to form a third motion image light beam that is projected onto the motion trajectory sensing element, and the motion trajectory sensing element receives the third motion image light beam to obtain the motion trajectory of the object moving on the light-transmitting element, wherein both the first motion image light beam and the third motion image light beam are substantially vertical moving light beams, and the second motion image light beam is a substantially horizontal moving light beam.

8. A motion trajectory capturing module comprising a light-emitting element, a light-splitting element, a first light-reflecting element, a second light-reflecting element, a lens assembly and a motion trajectory sensing element, characterized in that:
a projection light beam generated by the light-emitting element is reflected by the light-splitting element and a light-reflecting curved surface of the first light-reflecting element in sequence to form an illumination light beam that first passes through a light-transmitting element and then is projected onto an object moving on the light-transmitting element, the illumination light beam is reflected by the object to form an image light beam that is projected onto the light-reflecting curved surface and then is reflected by the light-reflecting curved surface, the image light beam first sequentially passes through the light-splitting element and the lens assembly and then is projected onto the motion trajectory sensing element through the second light-reflecting element, and the motion trajectory sensing element receives the image light beam to obtain a motion trajectory of the object moving on the light-transmitting element.

9. The motion trajectory capturing module of claim 8, wherein the projection light beam generated by the light-emitting element is reflected by the light-splitting element to form a first reflected light beam that is projected on the first light-reflecting element, the first reflected light beam is reflected by the light-reflecting curved surface of the first light-reflecting element to form a second reflected light beam that first passes through the light-transmitting element and then is projected onto the object, wherein both the projection light beam and the first reflected light beam are substantially horizontal moving light beams, and the second reflected light beam is a substantially vertical moving light beam.

10. The motion trajectory capturing module of claim 9, wherein the second reflected light beam is reflected by the object to form a first motion image light beam that first passes through the light-transmitting element and then is projected on the light-reflecting curved surface and is reflected by the light-reflecting curved surface, the first motion image light beam sequentially passes through the light-splitting element and the lens assembly to form a second motion image light beam that is projected onto the second light-reflecting element, the second motion image light beam is reflected by the second light-reflecting element to form a third motion image light beam that is projected onto the motion trajectory sensing element, and the motion trajectory sensing element receives the third motion image light beam to obtain the motion trajectory of the object moving on the light-transmitting element, wherein both the first motion image light beam and the third motion image light beam are substantially vertical moving light beams, and the second motion image light beam is a substantially horizontal moving light beam.

* * * * *